United States Patent
Lau et al.

(10) Patent No.: US 8,694,748 B2
(45) Date of Patent: Apr. 8, 2014

(54) DATA MERGING METHOD FOR NON-VOLATILE MEMORY MODULE, AND MEMORY CONTROLLER AND MEMORY STORAGE DEVICE USING THE SAME

(75) Inventors: Kiang-Giap Lau, Hsinchu County (TW); Kheng-Chong Tan, Miaoli (TW)

(73) Assignee: Phison Electronics Corp., Miaoli (TW)

( * ) Notice: Subject to any disclaimer, the term of this patent is extended or adjusted under 35 U.S.C. 154(b) by 155 days.

(21) Appl. No.: 13/479,290

(22) Filed: May 24, 2012

(65) Prior Publication Data
US 2013/0159605 A1    Jun. 20, 2013

(30) Foreign Application Priority Data

Dec. 15, 2011    (TW) .............................. 100146499 A

(51) Int. Cl.
*G06F 12/06*    (2006.01)

(52) U.S. Cl.
USPC .................. 711/165; 711/103; 711/E12.008; 711/E12.009

(58) Field of Classification Search
USPC .................. 711/103, 165, E12.008, E12.009
See application file for complete search history.

(56) References Cited

U.S. PATENT DOCUMENTS

| 2011/0202710 A1* | 8/2011 | Zhao et al. ..................... 711/103 |
| 2011/0296087 A1* | 12/2011 | Kim et al. ..................... 711/103 |
| 2013/0042051 A1* | 2/2013 | Huang et al. ................... 711/103 |

* cited by examiner

*Primary Examiner* — Hal Schnee
(74) *Attorney, Agent, or Firm* — Jianq Chyun IP Office

(57) ABSTRACT

A data merging method for merging valid data of one logical block in a rewritable non-volatile memory module is provided. The method includes assigning a plurality of log physical blocks for the logical block. The method also includes performing a data arrangement operation and a data move operation with a partial synchronization manner to copy the valid data of the logical block into the lower physical pages of the log physical blocks from a first data physical block and at least one spare physical block while programming the valid data of the logical block into a second data physical block from the lower physical pages of the log physical blocks in units of each physical page group. The method further includes remapping the logical block to the second physical block. Accordingly, the method can effectively shorten the time of merging valid data and improving the reliability of data writing.

21 Claims, 10 Drawing Sheets

| Lower physical page address | Middle physical page address | Upper physical page address | |
|---|---|---|---|
| 0 | 1 | 2 | — 0th physical page group |
| 3 | 4 | 5 | — 1th physical page group |
| 6 | 7 | 8 | — 2th physical page group |
| 9 | 10 | 11 | — 3th physical page group |
| 12 | 13 | 14 | — 4th physical page group |
| ⋮ | ⋮ | ⋮ | ⋮ |
| 255 | 256 | 257 | — 85th physical page group |

DATA MERGING METHOD FOR NON-VOLATILE MEMORY MODULE, AND MEMORY CONTROLLER AND MEMORY STORAGE DEVICE USING THE SAME

CROSS-REFERENCE TO RELATED APPLICATION

This application claims the priority benefit of Taiwan application serial no. 100146499, filed on Dec. 15, 2011. The entirety of the above-mentioned patent application is hereby incorporated by reference herein and made a part of this specification.

BACKGROUND

1. Technology Field

The present invention relates to a data merging method for a rewritable non-volatile memory module, a memory controller using the data merging method and a memory storage device using the data merging method.

2. Description of Related Art

Along with the widespread of digital cameras, cell phones, and MP3 in recently years, the consumers' demand to storage media has increased drastically. Since a rewritable non-volatile memory has several characteristics such as non-volatility of data, low power consumption, small size, non-mechanical structure, and fast reading and writing speed, the rewritable non-volatile memory is the most suitable memory applied in a portable electronic product, e.g. a laptop. A solid state drive (SSD) is a storage device utilizing a flash memory as a storage medium. Therefore, the flash memory industry has become a very popular part of the electronic industry in recent years.

According to the number of bits which each memory cell is capable of storing, NAND type flash memory can be classified into a Single Level Cell (SLC) NAND flash memory, a Multi Level Cell (MLC) NAND flash memory and a Trinary Level Cell (TLC) NAND flash memory. To be more specific, each memory cell in the SLC NAND flash memory is capable for storing one bit of data (i.e. "0" and "1"), each memory cell in the MLC NAND flash memory is capable for storing two bits of data and each memory cell in the TLC NAND flash memory is capable for storing three bits of data.

A MLC NAND flash memory has a plurality of physical blocks, and each of the physical blocks includes a plurality of physical pages.

To be more specific, a physical page is constituted by a plurality of memory cells arranged on the same word line in NAND flash memory. Since each memory cell of the SLC NAND flash memory can store one bit of data, a plurality of memory cells arranged on the same word line in the SLC NAND flash memory are corresponding to one physical page.

In contrast to the SLC NAND flash memory, a floating gate storage layer in each memory cell of the MLC NAND flash memory can store two bits of data, and every storage state (i.e. "11", "10", "01", "00") includes the Least Significant Bit (LSB) and the Most Significant Bit (MSB). For instance, the first bit counted from the left side of the storage state is the LSB, and the second bit counted from the left side of the storage state is the MSB. Therefore, two physical pages can be constituted by several memory cells arranged on the same word line, and the physical pages constituted by the LSB and the MSB of the memory cells are respectively the lower physical page and the upper physical page. Especially, for writing data into the physical pages, the writing speed of the lower physical page is faster than the writing speed of the upper physical page. In addition, when an error is happened in the process of programming the upper physical page, data stored in the lower physical page may be lost, too.

Similarly, each memory cell in TLC NAND flash memory can store three bits of data, and every storage state (i.e. "111", "110", "101", "100", "011", "010", "001" and "000") includes the LSB which is the first bit counted from the left side, the Center Significant Bit (CSB) which is the second bit counted from the left side and the MSB which is the third bit counted from the left side. Accordingly, three physical pages can be constituted by several memory cells arranged on the same word line. The physical pages constituted by the LSB, the CSB and the MSB of the memory cells are respectively the lower physical page, the middle physical page and the upper physical page. In particular, when storing data into the physical pages constituted by several memory cells arranged on the same word line, only the programmed lower physical page can be selected to store data, or all of the programmed lower physical pages, the programmed middle physical pages and the programmed upper physical pages can be selected simultaneously to store data, otherwise, the stored data may be lost. For example, if data are only stored in the lower physical pages and the middle physical pages constituted by several memory cells arranged on the same word line, a read operation of reading data from the lower physical pages or the middle physical pages will be failed.

In addition, data is written into the physical blocks in a unit of each physical page, and each of the physical pages with the data has to be erased before writing data again. Specially, a physical block is the smallest erasing unit. Therefore, generally speaking, in the process of writing data into the flash memory module, the physical blocks alternately store data.

For example, when data of a logical block are stored in a data physical block (hereinafter "the original data mapping physical block"), and the host system is about to update the data stored in the logical page of the logical block, a physical block is selected from the flash memory module by the memory controller of the storage apparatus to be a spare physical block corresponding to the logical block, and the update data are written into the physical pages of the spare physical block for shortening the time of executing the write command. When the unused physical blocks in the flash memory module are exhausted, the memory controller executes the merge process to the logical block. For instance, in the process of merging data, the memory controller selects a blank physical block to be a new data physical block, copies all of the valid data which belongs to the logical block from the original data mapping physical block and the spare physical block to the new data physical block, and maps the logical block to the new data physical block.

However, as described above, the reliability of a portion of the physical pages in the MLC NAND flash memory or the TLC NAND flash memory is lower than other physical pages. Therefore, how to move the data effectively between physical blocks for the data merging process is a target for the people skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data merging method, a memory controller and a memory storage device capable for improving the efficiency of data merging and the reliability of the written data.

According to an exemplary embodiment of the present invention, a data merging method for merging valid data of one logical block in a rewritable non-volatile memory module is provided. The rewritable non-volatile memory module includes a plurality of physical blocks, each of the physical blocks includes a plurality of physical page groups, each of the physical page group includes at least a lower physical page and an upper physical page, and the speed of writing data into the lower physical page is faster than the speed of writing data into the upper physical page. The valid data of the logical block is separately stored in a first data physical block and at least one spare physical block, and the valid data of the logical block is to be merged to the second data physical block. The present data merging method includes: assigning a plurality of log physical blocks corresponding to the logical block. In addition, the present data merging method further includes performing a data arrangement operation and a data move operation with a partial synchronization manner. Herein, the data arrangement operation is performed to arrange and copy the valid data of the logical block from the first data physical block and the spare physical block to the lower physical pages of the log physical blocks, and the data move operation is performed to move the valid data of the logical block from the log physical blocks to the second data physical block. Moreover, the present data merging method further includes: remapping the logical block to the second data physical block.

According to an exemplary embodiment of the present invention, a memory controller for controlling the rewritable non-volatile memory module is provided. The rewritable non-volatile memory module includes a plurality of physical blocks, each of the physical blocks includes a plurality of physical page groups, each of the physical page group includes at least a lower physical page and an upper physical page, and the speed of writing data into the lower physical page is faster than the speed of writing data into the upper physical page. The memory controller includes a host interface, a memory interface and a memory management circuit. The host interface is configured to couple to a host system. The memory interface is configured to couple to the rewritable non-volatile memory module. The memory management circuit is coupled to the host interface and the memory interface and configured to merge the valid data of one logical block to the second data physical block, wherein the valid data of the logical block are separately stored in the first data physical block and the spare physical block. Herein, the memory management circuit is configured to assign a plurality of log physical blocks corresponding to the logical block. In addition, the memory management circuit is configured to perform the data arrangement operation and the data move operation with the partial synchronization manner. The data arrangement operation is performed for arranging and copying the valid data of the logical block from the first data physical block and the spare physical block to the lower physical pages of the log physical blocks, and the data move operation is performed for moving the valid data of the logical block from the log physical blocks to the second data physical block. Moreover, the memory management circuit is further configured to remap the logical block to the second data physical block.

According to an exemplary embodiment of the present invention, a memory storage device including a connector, a rewritable non-volatile memory module and a memory controller is provided. The connector is configured to couple to a host system. The rewritable non-volatile memory module includes a plurality of physical blocks, each of the physical blocks includes a plurality of physical page groups, each of the physical page groups includes at least a lower physical page and an upper physical page, and the speed of writing data into the lower physical page is faster than the speed of writing data into the upper physical page. The memory controller is coupled to the connector and the rewritable non-volatile memory module and configured to merge valid data of one logical block to the second data physical block, wherein the valid data of the logical block is separately stored in the first data physical block and the spare physical block. Herein, the memory controller is configured to assign a plurality of log physical blocks corresponding to the logical block. In addition, the memory controller is configured to perform the data arrangement operation and the data move operation with the partial synchronization manner. The data arrangement operation is performed for arranging and copying the valid data of the logical block described above from the first data physical block and the spare physical block to the lower physical pages of the log physical blocks, and the data move operation is performed for moving the valid data of the logical block described above from the log physical blocks to the second data physical block. Moreover, the memory controller is further configured to remap the logical block to the second data physical block.

In light of the foregoing descriptions, according to the exemplary embodiments of the present invention, the data merging method, the memory controller and the memory storage device can effectively improve the reliability of merging the valid data and shorten the time of merging the valid data.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Herein, the drawings illustrate embodiments of the invention and, together with the description, serve to explain the principles of the invention.

DESCRIPTION OF THE EMBODIMENTS

Figure 1A:
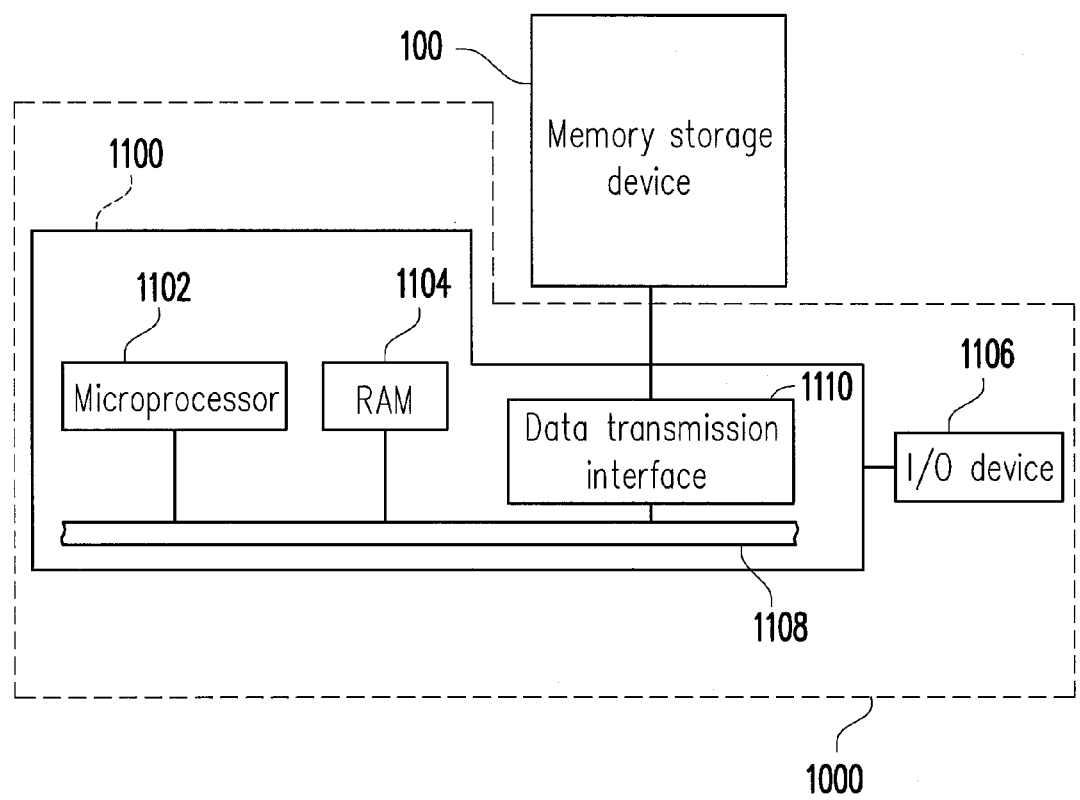
FIG. 1A illustrates a host system and a memory storage device according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (i.e. a memory storage system) includes a rewritable non-volatile memory module and a controller (i.e. a control circuit). The memory storage device is usually used together with a host system, such that the host system can write data into or read data from the memory storage device.

FIG. 1A illustrates a host system and a memory storage device according to an exemplary embodiment of the present invention.

Figure 1B:
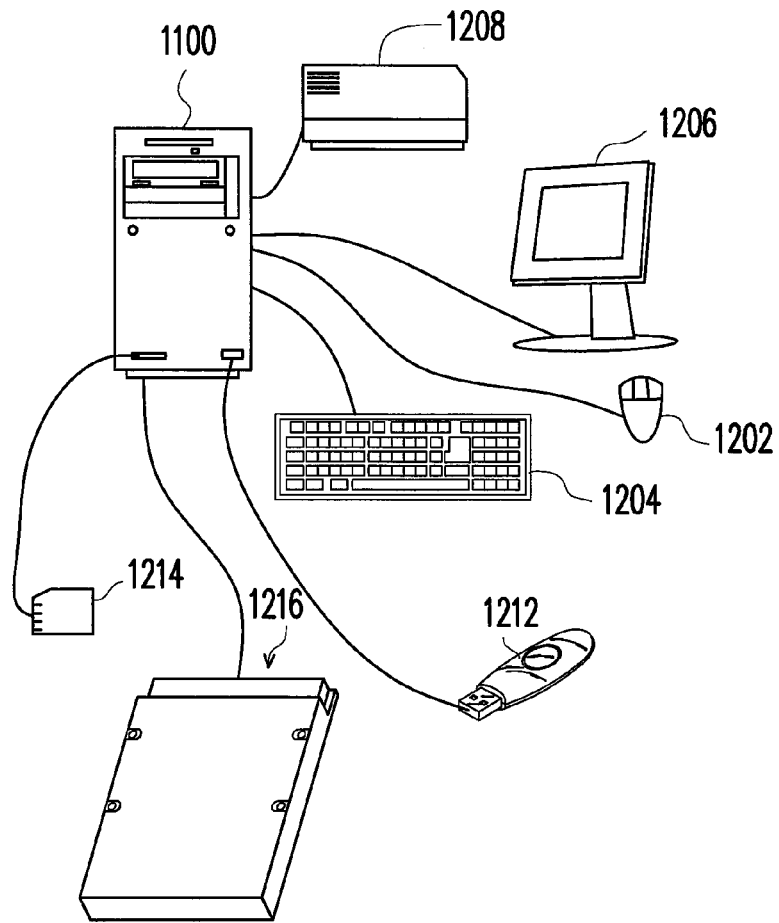
FIG. 1B is a schematic diagram illustrating a computer, an I/O device and a memory storage device according to an exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 1B. It should be understood that the devices illustrated in FIG. 1B are not intended to limit the I/O device 1106, and the I/O device 1106 may further include other devices.

According to an exemplary embodiment of the present invention, the memory storage device 100 is coupled to other elements of the host system 1000 through the data transmission interface 1110. By using the microprocessor 1102, the random access memory (RAM) 1104 and the I/O device 1106, data may be written into or read from the memory storage device 100. For instance, the memory storage device 100 may be a rewritable non-volatile memory storage device, such as a flash drive 1212, a memory card 1214, or a solid state drive (SSD) 1216, as shown in FIG. 1B.

Figure 1C:
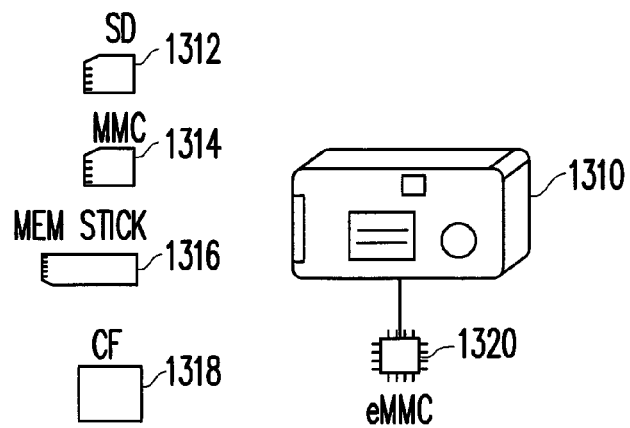
FIG. 1C is a schematic diagram illustrating a host system and a memory storage device according to another exemplary embodiment of the present invention.

Generally speaking, the host system 1000 may substantially be any system collocated with the memory storage device 100 for storing data. Even though the host system 1000 is described as a computer system in the present exemplary embodiment, in another exemplary embodiment of the present invention, the host system 1000 may be a digital camera, a video camera, a telecommunication device, an audio player, or a video player. For example, if the host system is a digital camera (video camera) 1310, the rewritable non-volatile memory storage device is then a secure digital (SD) card 1312, a multi media card (MMC) 1314, a memory stick 1316, a compact flash (CF) card 1318 or an embedded storage apparatus 1320 (as shown in FIG. 1C). The embedded storage apparatus 1320 includes an embedded MMC (eMMC). It should be mentioned that the eMMC is directly coupled to a substrate of the host system.

Figure 2:
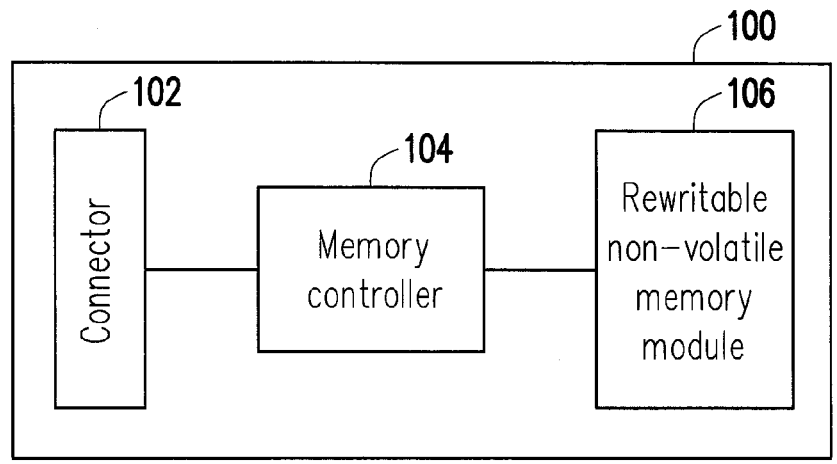
FIG. 2 is a schematic block diagram illustrating the memory storage device shown in FIG. 1A.

FIG. 2 is a schematic block diagram illustrating the memory storage device shown in FIG. 1A.

Referring to FIG. 2, the memory storage device 100 includes a connector 102, a memory controller 104, and a rewritable non-volatile memory module 106.

In the present exemplary embodiment, the connector 102 complies with the secure digital (SD) interface standard. However, the present invention is not limited thereto, and the connector 102 may also complies with the Institute of Electrical and Electronic Engineers (IEEE) 1394 standard, the parallel advanced technology attachment (PATA) standard, the peripheral component interconnect express (PCI Express) standard, the universal serial bus (USB) standard, the serial advanced technology attachment (SATA) standard, the memory stick (MS) interface standard, the multi media card (MMC) interface standard, the compact flash (CF) interface standard, the integrated device electronics (IDE) standard, or other suitable standards.

The memory controller 104 is configured to execute a plurality of logic gates or control commands implemented in a hardware form or in a firmware form, and perform various data operations, such as data writing, data reading or data erasing in the rewritable non-volatile memory module 106 according to the commands issued by the host system 1000.

The rewritable non-volatile memory module 106 is coupled to the memory controller 104 and has a plurality of physical blocks for storing data written by the host system 1000.

In the present exemplary embodiment, each of the physical blocks has a plurality of physical page groups, and each of the physical page groups includes at least one physical page constituted by memory cells arranged on the same word line, wherein the physical pages belonging to the same physical block have to be erased simultaneously. To be more specific, the physical block is the smallest unit for data erasing. Namely, each of the physical blocks contains the least number of memory cells that are erased all together.

Each of the physical pages usually includes a data bit area and a redundant bit area. The data bit area is configured for storing the user data, and the redundant bit area is configured for storing the system data (e.g. an error checking and correcting (ECC) code). In the present exemplary embodiment, each of the physical blocks is constituted by 258 physical pages and the capacity of each physical page is 8 kilobytes (KB). Nevertheless, it should be understood that the present invention is not limited thereto.

In the present exemplary embodiment, the rewritable non-volatile memory module 106 is a Trinary Level Cell (TLC) NAND flash memory module. However, it should be understood that the rewritable non-volatile memory module 106 is not limited to the TLC NAND flash memory module. According to another exemplary embodiment of the present invention, the rewritable non-volatile memory module 106 may be a MLC NAND flash memory module or other memory modules having the same characteristics.

Figure 3A:
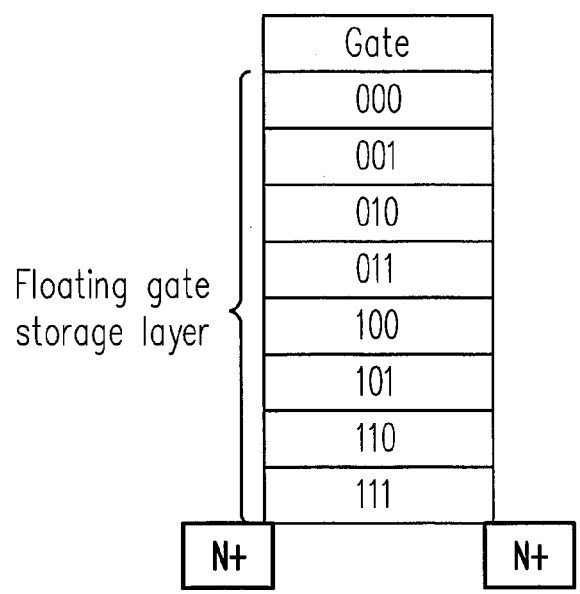
FIG. 3A and FIG. 3B are schematic diagrams illustrating a memory cell storage structure and a physical block according to an exemplary embodiment of the present invention.
Figures 3B, 4:
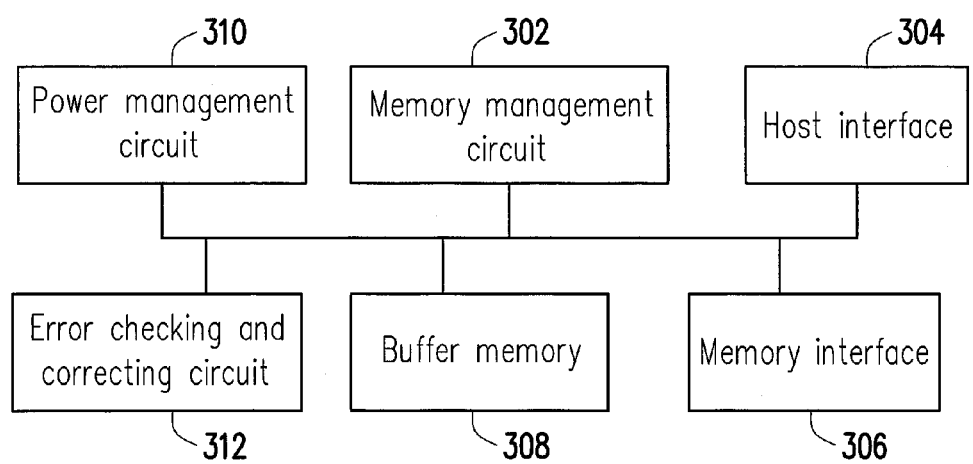
FIG. 4 is a schematic block diagram illustrating a memory controller according to an exemplary embodiment.

FIG. 3A and FIG. 3B are schematic diagrams illustrating a memory cell storage structure and a physical block according to an exemplary embodiment of the present invention.

Referring to FIG. 3A, each storage state (i.e., "111," "110," "101," "100," "011," "010," "001," or "000") of each memory cell in the rewritable non-volatile memory module 106 can be identified (as shown in FIG. 3A), wherein the first bit from the left of the storage states is the LSB, the second bit from the left of the storage states is the CSB, and the third bit from the left of the storage states is the MSB. Besides, several memory cells arranged on the same word line may constitute three physical pages, wherein the physical pages constituted by the LSB, the CSB, and the MSB of the memory cells are lower physical pages, middle physical pages, and upper physical pages, respectively.

Referring to FIG. 3B, in the present exemplary embodiment, one physical block is constituted by a plurality of physical page groups (i.e. $0^{th}$ physical page group to $85^{th}$ physical page group), and each of the physical page groups includes a lower physical page, a middle physical page and an upper physical page that are constituted by a plurality of memory cells arranged on the same word line. For instance, the $0^{th}$ physical page belonging to the lower physical page, the $1^{st}$ physical page belonging to the middle physical page and the $2^{nd}$ physical page belonging to the upper physical page are regarded as one physical page group. Similarly, the $3^{rd}$, $4^{th}$, and $5^{th}$ a physical pages are regarded as one physical page group, and so are the other physical pages.

FIG. 4 is a schematic block diagram illustrating a memory controller according to an exemplary embodiment. It should be understood that the memory controller illustrated in the FIG. 4 is merely an exemplary, and the present invention is not limited thereto.

Referring to FIG. 4, the memory controller 104 includes a memory management circuit 302, a host interface 304, a memory interface 306, a buffer memory 308, a power management circuit 310, and an error checking and correcting (ECC) circuit 312.

The memory management circuit 302 is configured for controlling the overall operation of the memory controller 104. Specifically, the memory management circuit 302 has a plurality of control commands. When the memory storage device 100 is operated, the control commands are executed to perform various data operation such as data writing, data reading and data erasing.

In the present exemplary embodiment, the control instructions of the memory management circuit 320 are implemented in a firmware form. For instance, the memory management circuit 302 has a microprocessor unit (not shown) and a read-only memory (ROM, not shown), and the control instructions are burnt into the read-only memory. When the memory storage device 100 is operated, the control instructions are executed by the microprocessor unit for various data operations, such as data writing, data reading or data erasing.

According to another exemplary embodiment of the present invention, the control commands of the memory management circuit 302 may also be stored in a specific area (for example, the system area in the memory module exclusively used for storing system data) of the rewritable non-volatile memory module 106 as program codes. Moreover, the memory management circuit 302 has a microprocessor unit (not shown), a read-only memory (not shown), and a random access memory (not shown). Specifically, the read-only memory has boot codes. When the memory controller 104 is enabled, the boot codes are first executed by the microprocessor unit for loading the control commands stored in the rewritable non-volatile memory module into the random access memory of the memory management circuit 302. Afterwards, the microprocessor unit executes the control commands for various data operation such as data writing, data reading and data erasing.

Additionally, according to another exemplary embodiment of the present invention, the control commands of the memory management circuit 320 may be implemented in a hardware form. For example, the memory management circuit 320 includes a microcontroller, a memory management unit, a memory writing unit, a memory reading unit, a memory erasing unit and a data processing unit. The memory management unit, the memory writing unit, the memory reading unit, the memory erasing unit and the data processing unit are coupled to the microcontroller. The memory management unit is configured to manage the physical blocks of the rewritable non-volatile memory module 106; the memory writing unit is configured to issue a write command to the rewritable non-volatile memory module 106 in order to write data into the rewritable non-volatile memory module 106; the memory reading unit is configured to issue a read command to the rewritable non-volatile memory module 106 to read data from the rewritable non-volatile memory module 106; the memory erasing unit is configured to issue an erase command to the rewritable non-volatile memory module 106 to erase data from the rewritable non-volatile memory module 106; the data processing unit is configured to process both data to be written into the rewritable non-volatile memory module 106 and data to be read from the rewritable non-volatile memory module 106.

The host interface 304 is coupled to the memory management circuit 302 and configured to receive and identify commands and data transmitted from the host system 1000. In the present exemplary embodiment, the host interface 304 complies with the SD standard. However, it should be understood that the present invention is not limited thereto, and the host interface 304 may also comply with a PATA standard, an IEEE 1394 standard, a PCI Express standard, a USB standard, a SATA standard, a MS standard, a MMC standard, a CF standard, an IDE standard, or other suitable standards for data transmission.

The memory interface 306 is coupled to the memory management circuit 302 for accessing the rewritable non-volatile memory module 106. In other words, data to be written into the rewritable non-volatile memory module 106 is converted as an acceptable format to the rewritable non-volatile memory module 106 by the memory interface 306.

The buffer memory 308 is coupled to the memory management circuit 302 and configured to temporarily store data and commands from the host system 1000 or data from the rewritable non-volatile memory module 106. For instance, the buffer memory 302 may be a static random access memory, a dynamic random access memory, and so on.

The power management circuit 310 is coupled to the memory management circuit 302 and configured to control the power of the of the memory storage device 100.

The error checking and correcting (ECC) circuit 312 is coupled to the memory management circuit 302 and configured to execute an error correcting procedure to ensure the accuracy of data. To be specific, when the host interface 304 receives a host write command from the host system 1000, the error checking and correcting (ECC) circuit 312 generates an error checking and correcting (ECC) code for the write data (i.e. the updated data) corresponding to the host write command, and the memory management circuit 302 writes the updated data and the corresponding ECC code into the rewritable non-volatile memory module 106. Subsequently, when the memory management circuit 302 reads the data from the rewritable non-volatile memory module 106, the corresponding ECC code is also read by the memory management circuit 302 simultaneously, and the ECC circuit 312 executes the error correcting procedure for the read data based on the ECC code.

Figure 5:
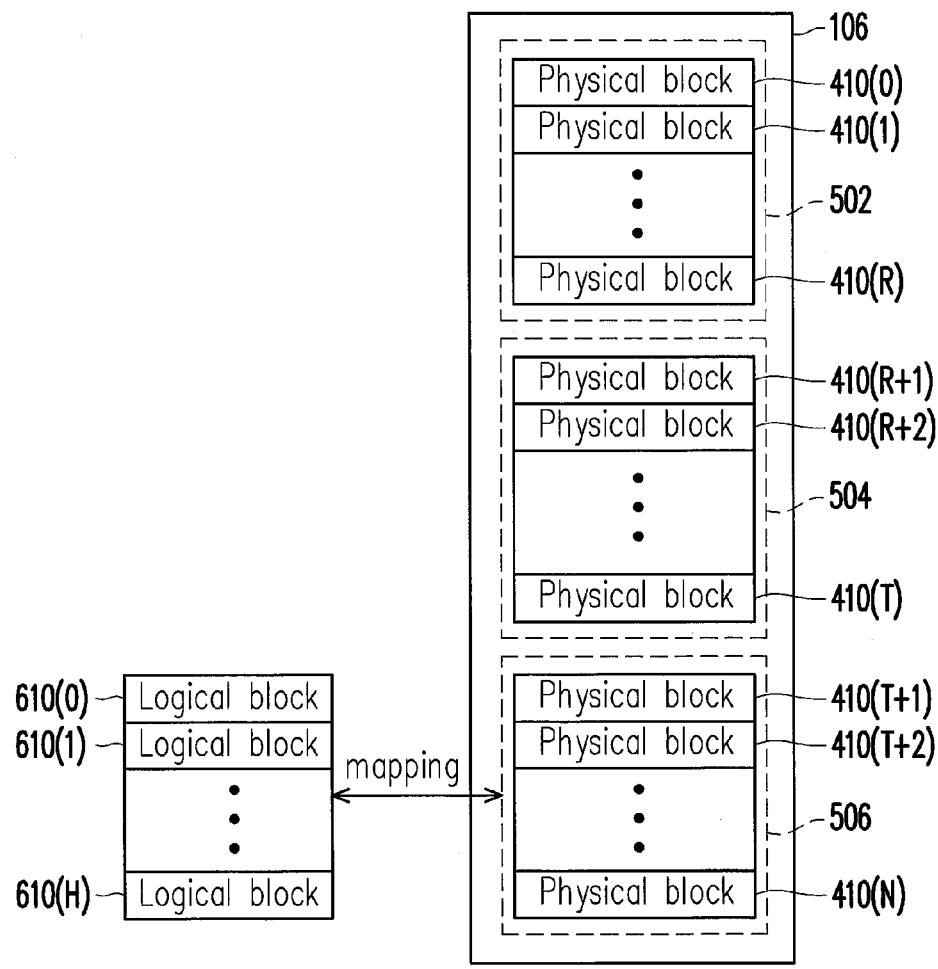
FIG. 5 is a diagram of managing physical blocks in a rewritable non-volatile memory module according to an exemplary embodiment.

FIG. 5 is a diagram of managing physical blocks in a rewritable non-volatile memory module according to an exemplary embodiment.

Referring to FIG. 5, the rewritable non-volatile memory module 106 has physical blocks 410(0)~410(N) which are partitioned into a replacement area 502, a spare area 504 and a data area 506 by the memory management circuit 302 of the memory controller 104.

The physical blocks belonging to the replacement area 502 are used for replacing the damaged physical blocks in a damaged physical block replacement procedure. Specifically, if the replacement area 502 still has normal physical blocks and the physical block belonging to the data area 506 or the spare area 504 is damaged, the memory management circuit 302 retrieves the normal physical block from the replacement area 502 to replace the damaged physical block.

The physical blocks belonging to the spare area 504 are configured to temporarily store the data written by the host system 1000. The detailed data writing method is described hereinafter with reference to the drawings. It should be noted that, in the present exemplary embodiment, a single-page mode is applied by the memory management circuit 302 for operating the physical blocks belonging to the spare area 504. To be more specific, data are merely stored in the lower physical pages in the single-page mode. In other words, the memory management circuit 302 only performs various operations, such as data writing, data reading and data erasing, to the lower physical pages in the single-page mode.

The physical blocks belonging to the data area 506 (i.e., data physical block) are configured to store data written by the host system 1000. To be more specific, the memory management circuit 302 converts the logical access addresses accessed by the host system 1000 to the corresponding logical blocks and the corresponding logical pages, and maps the logical pages of the logical blocks to the physical pages of the physical blocks belonging to the data area 506. Namely, the physical blocks belonging to the data area 506 are deemed as the used physical blocks (e.g. the physical blocks are already used for storing the data written by the host system). For instance, a logical block-physical block mapping table is applied by the memory management circuit 302 for recording the mapping relationship between the logical blocks and the physical blocks of the data area 506, wherein the logical pages belonging to the logical blocks are mapped to the corresponding physical pages belonging to the physical blocks in sequence. For another example, according to the present exemplary embodiment, logical blocks 610(0)~610(H) are configured to map the physical blocks of the data area 506, the capacity of one logical block is equal to the capacity of one physical block, and the number of the physical blocks belonging to the data area 506 should be equal to or greater than the number of the logical blocks. That is, the number of the physical blocks belonging to the data area 506 is related to the capacity of the memory storage device 100. In the present exemplary embodiment, the number of logical blocks 610(0)~610(H) is equal to the number of physical blocks belonging to the data area 506.

According to an exemplary embodiment, a multi-page mode is applied by the memory management circuit 302 for controlling the physical blocks belonging to the data area 506. Specifically, the lower physical page, the middle physical page and the upper physical page of each physical page group belonging to the physical block are used for storing the data in multi-page mode. In addition, compared to the physical blocks operated in the single-page mode, the physical blocks operated in the multi-page mode have shorter durability. In specific, the times of writing data into or erasing data from each physical block is limited. When the number of times of writing data into a physical block exceeds a threshold, the physical block is damaged and unavailable for receiving data. Accordingly, the threshold of the physical block operated in the multi-page mode is lower than the threshold of the physical block operated in the single-page mode.

Based on the description above, the physical blocks of the spare area 504 and the physical blocks of the data area 506 are operated in different modes, once a physical block is partitioned to the spare area 504 or the data area 506, the physical block can only be used in the designated area. In other words, the physical blocks of the data area 506 and the physical blocks of the spare area 504 are respectively and independently used by the memory management circuit 302 rather than collectively used by the memory management circuit 302. For example, once a physical block is partitioned to the spare area 504, the physical block belonging to the spare area 504 is operated by the memory management circuit 302 in the single-page mode until the physical block is damaged, or once a physical block is partitioned to the data area 506, the physical block of the data area 506 is operated by the memory management circuit 302 in the multi-page mode until the physical block no longer belongs to the data area 506.

Figure 6:
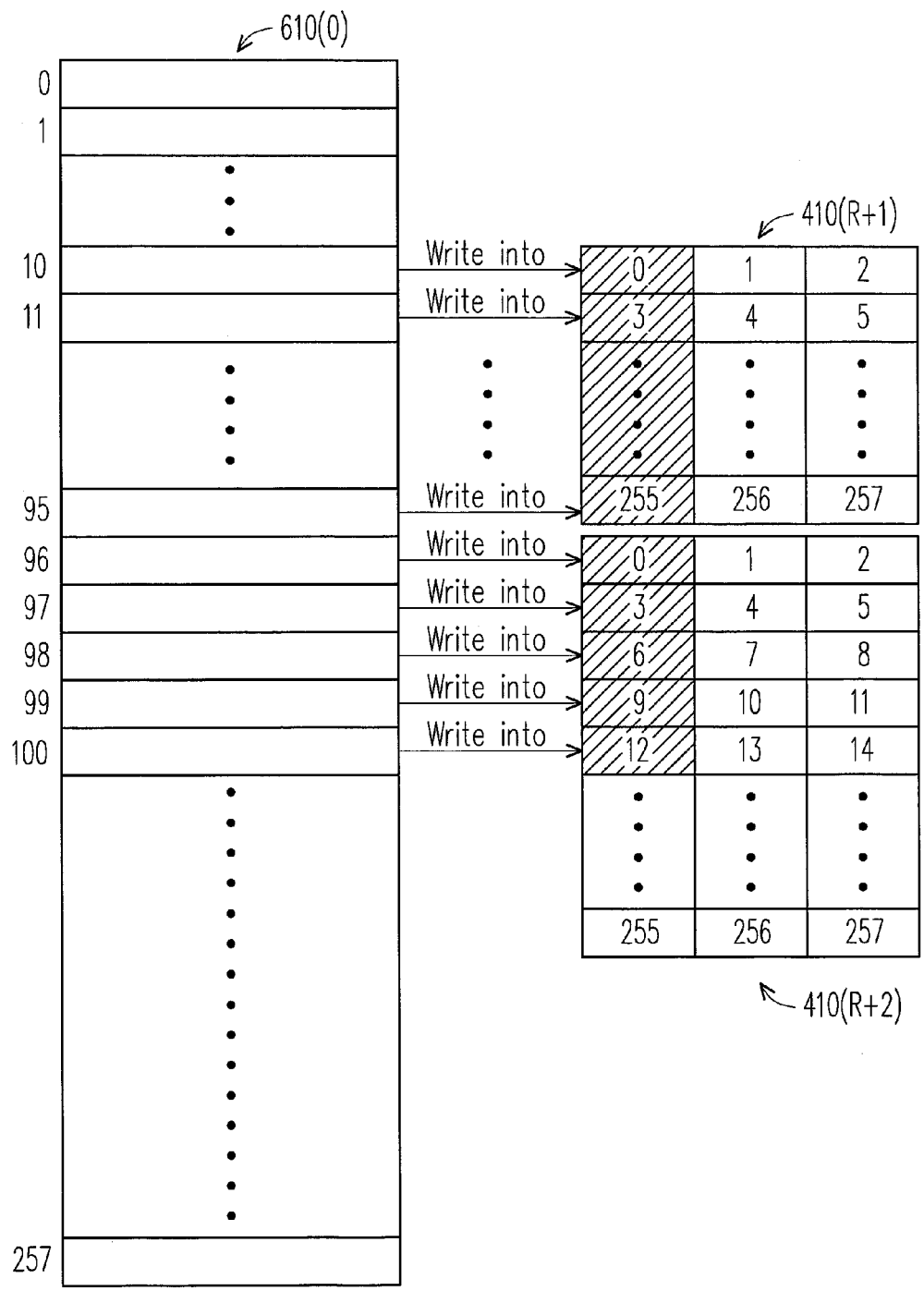
FIG. 6 is a diagram illustrating an example of writing data.

FIG. 6 is a diagram illustrating an example of writing data.

Referring to FIG. 6, assuming that the data of all the logical pages belonging to the logical block 610(0) is stored in the data physical block 410(T+1) of the data area 506 (i.e., the logical block 610(0) is mapped to the data physical block 410(T+1)). When the memory storage device 100 receives a write command from the host system 1000 for storing the updated data to the $10^{th}$~$100^{th}$ logical pages belonging to the logical block 610(0), the memory management circuit 302 selects physical blocks 410(R+1)~410(R+2) from the spare area 504 as the first spare physical block and the second spare physical block corresponding to the logical block 610(0) for storing the updated data belonging to the logical block 610(0). Specifically, since the physical block of the spare area 504 can merely be programmed in the single-page mode, two spare physical blocks are needed for enough capacity to store the data belonging to 91 logical pages (i.e. $10^{th}$~$100^{th}$ logical pages belonging to the logical block 610(0)).

Next, the updated data to be stored in the $10^{th}$~$95^{th}$ logical pages of the logical block 610(0) are written into the lower physical pages (i.e., the $0^{th}$, the $3^{rd}$, the $6^{th}$ . . . , the $252^{th}$ and the $255^{th}$ physical pages) of the first spare physical block 410(R+1), and the updated data to be stored in the $96^{th}$~$100^{th}$ logical pages of the logical block 610(0) are written into the lower physical pages (i.e., the $0^{th}$, the $3^{rd}$, the $6^{th}$, the $9^{th}$ and the $12^{th}$ physical pages) of the second spare physical block 410(R+2).

According to the present exemplary embodiment, when the updated data to be stored by the host system 1000 are written into the spare physical block, a response indicating the completion of the data writing is transmitted to the host system 1000 by the memory management circuit 302. Thereafter, if the memory storage device 100 is in an idle state for a period of time (e.g., the memory storage device does not receive any command from the host system for 30 seconds) or the number of available physical blocks in the spare area 504 is lower than a predetermined threshold, the memory management circuit 302 moves the valid data belonging to the same logical block from the spare area 504 to the blank data physical block of the data area 506. For instance, the predetermined threshold is set to be 3. Nevertheless, it should be understood that the present invention is not limited thereto, so the predetermined threshold may be other appropriate thresholds. Herein, the operation of moving the valid data belonging to the same logical block of the spare area 504 into the blank data physical block of the data area 506 is referred as a data merging operation including a data arrangement operation and a data move operation.

Figure 7:
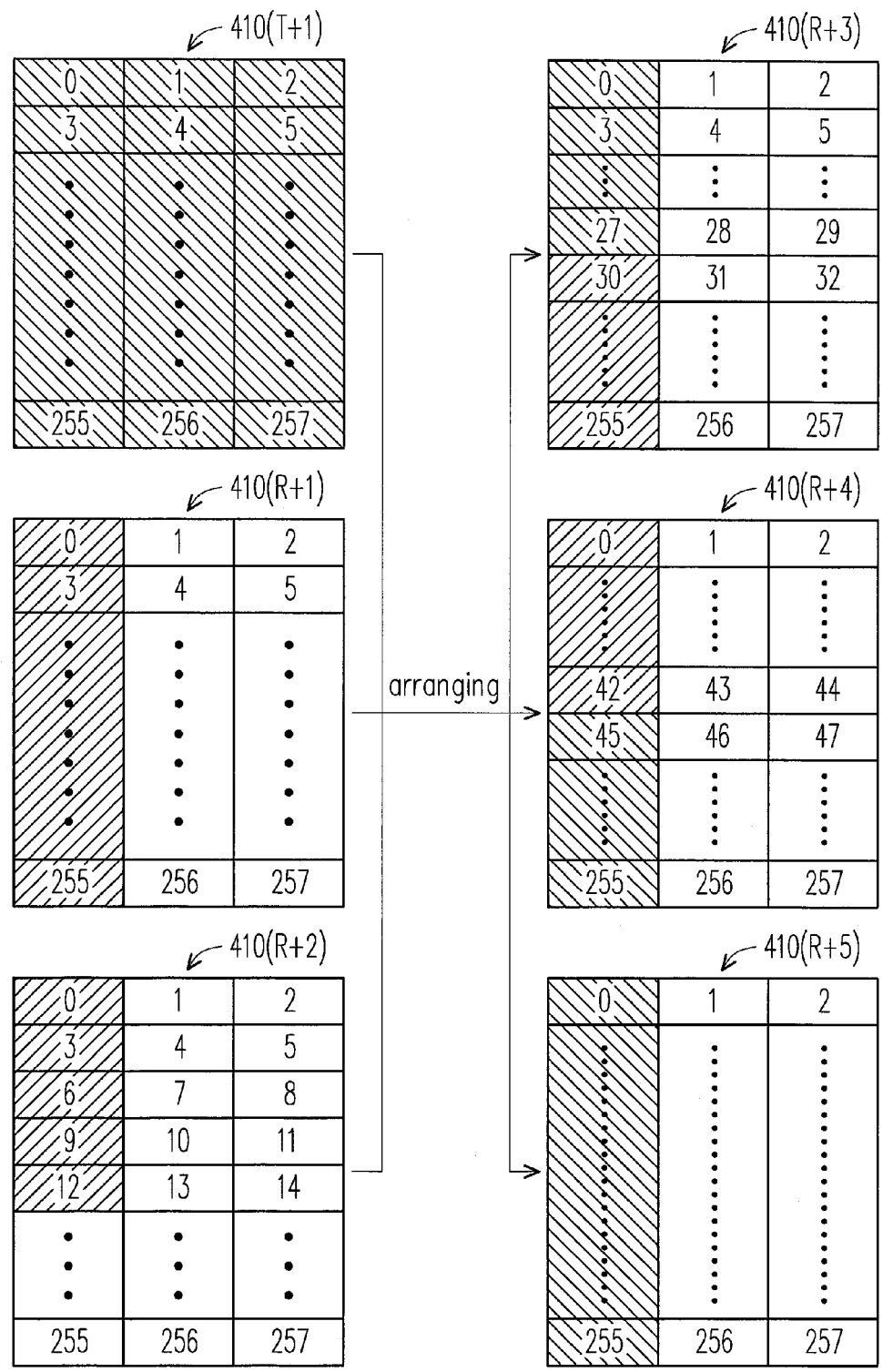
FIG. 7 and FIG. 8 are schematic diagrams illustrating a data merging operation according to an exemplary example.
Figure 8:
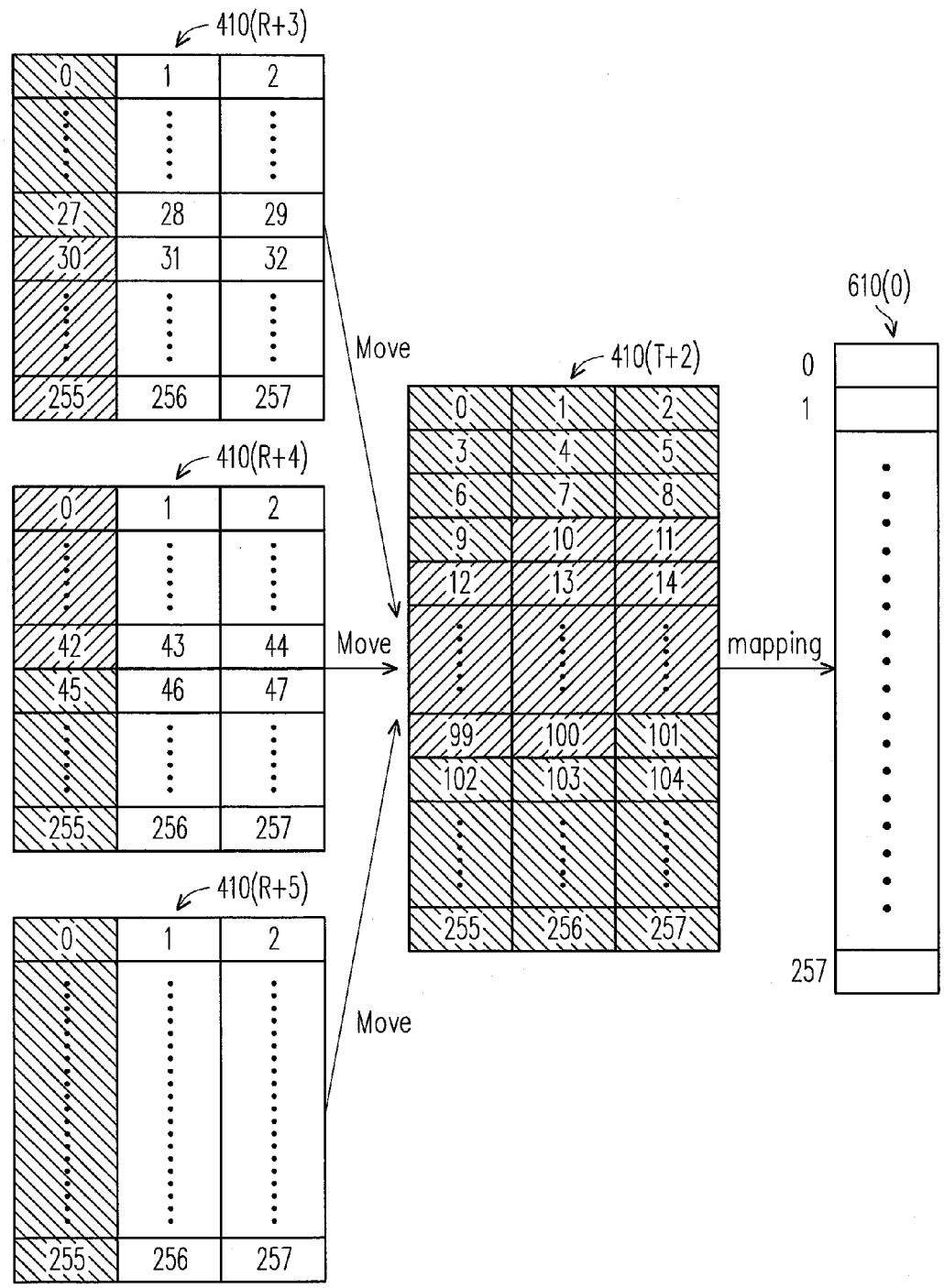

FIG. 7 and FIG. 8 are schematic diagrams illustrating the data merging operation according to an exemplary example, wherein FIG. 7 illustrates the data arrangement operation and FIG. 8 illustrates the data move operation.

With reference to FIG. 7, it is assumed that the data physical block 410(T+1) and the spare physical blocks 410(R+1) and 410(R+2) respectively store the valid data of a portion of the logical pages belonging to the logical block 610(0) (as shown in FIG. 6), and the memory management circuit 302 selects the logical block 610(0) to perform the data merging operation. First, the physical blocks 410(R+3), 410(R+4) and 410(R+5) are selected by the memory management circuit 302 from the spare area 504 as the first log physical block to the third log physical block corresponding to the logical block 610(0) for storing all of the valid data belonging to the logical block 610(0). To be more specific, since the physical blocks of the spare area 504 can merely be programmed in the single-page mode, 3 log physical blocks are needed for enough capacity to store the data of all the logical pages belonging to one logical block.

Next, the valid data of all the logical pages belonging to the logical block 610(0) are copied to the log physical blocks 410(R+3), 410(R+4) and 410(R+5) from the data physical block 410(T+1) and the spare physical blocks 410(R+1), 410(R+2) in sequence.

Specifically, the memory management circuit 302 copies the valid data of the $0^{th}$~$9^{th}$ logical pages belonging to the logical block 610(0) from the data physical block 410(T+1) to the $0^{th}$, $3^{rd}$, $6^{th}$, $24^{th}$ and $27^{th}$ physical pages of the log physical block 410(R+3) sequentially, and copies the valid data of the $10^{th}$~$85^{th}$ logical pages belonging to the logical block 610(0) from the spare physical block 410(R+1) to the $30^{th}$, $33^{rd}$, ..., $252^{nd}$ and the $255^{th}$ physical pages of the log physical block 410(R+3) sequentially. In more detail, since the data of the $0^{th}$~$9^{th}$ logical pages belonging to the logical block 610(0) are not updated, the memory management circuit 302 copies the data of the $0^{th}$~$9^{th}$ logical pages belonging to the logical block 610(0) from the data physical block 410(T+1) mapped by the logical block 610(0) to the log physical block 410(R+3). In addition, since the updated data of the $10^{th}$~$85^{th}$ logical pages belonging to the logical block 610(0) are already stored in the spare physical block 410(R+1), the memory management circuit 302 moves the data of the $10^{th}$~$85^{th}$ logical pages belonging to the logical block 610(0) from the spare physical block 410(R+1) to the log physical block 410(R+3).

Further, the memory management circuit 302 copies the valid data of the $86^{th}$~$100^{th}$ logical pages belonging to the logical block 610(0) from the spare physical blocks 410(R+1) and 410(R+2) to the $0^{th}$, $3^{rd}$, ..., $39^{th}$ and $42^{nd}$ physical pages of the log physical block 410(R+4) sequentially, and copies the valid data of the $101^{th}$~$171^{th}$ logical pages belonging to the logical block 610(0) from the data physical block 410(T+1) to the $45^{th}$, $48^{th}$, ..., $252^{nd}$ and the $255^{th}$ physical pages of the log physical block 410(R+4) sequentially. In more detail, since the updated data of the $86^{th}$~$95^{th}$ logical pages belonging to the logical block 610(0) are already stored in the spare physical block 410(R+1), the memory management circuit 302 moves the data of the $86^{th}$~$95^{th}$ logical pages belonging to the logical block 610(0) from the spare physical block 410(R+1) to the log physical block 410(R+4). In addition, since the updated data of the $96^{th}$~$100^{th}$ logical pages belonging to the logical block 610(0) are already stored in the spare physical block 410(R+2), the memory management circuit 302 moves the data of the $96^{th}$~$100^{th}$ logical pages belonging to the logical block 610(0) from the spare physical block 410(R+2) to the log physical block 410(R+4). Furthermore, since the data of the $101^{th}$~$171^{th}$ logical pages belonging to the logical block 610(0) are not updated, the memory management circuit 302 moves the data of the $101^{th}$~$171^{th}$ logical pages belonging to the logical block 610(0) from the data physical block 410(T+1) mapped by the logical block 610(0) to the log physical block 410(R+4).

Then, the memory management circuit 302 copies the valid data of the $172^{th}$~$257^{th}$ logical pages belonging to the logical block 610(0) from the data physical block 410(T+1) to the $0^{th}$, $3^{rd}$, ..., $252^{nd}$ and $255^{th}$ physical pages of the log physical blocks 410(R+5) in sequence. In more detail, since the data of the $172^{th}$~$257^{th}$ logical pages belonging to the logical block 610(0) are not updated, the memory management circuit 302 moves the data of the $172^{th}$~$257^{th}$ logical pages belonging to the logical block 610(0) from the data physical block 410(T+1) mapped by the logical block 610(0) to the log physical block 410(R+5).

It should be noted that, since the valid data of all the logical pages belonging to the logical block 610(0) are already copied to the log physical blocks 410(R+3), 410(R+4) and 410(R+5), according to an exemplary embodiment of the present invention, the memory management circuit 302 marks the data physical block 410(T+1) as a physical block storing the invalid data or performs the erase operation to the data physical block 410(T+1). Similarly, according to an exemplary embodiment of the present invention, the memory management circuit 302 marks the spare physical blocks 410(R+1) and 410(R+2) as the physical blocks storing the invalid data or performs the erase operation to the spare physical blocks 410(R+1) and 410(R+2). Therefore, the physical blocks 410(R+1) and 410(R+2) are available for data writing when the next write command is executed.

Referring to FIG. 8, after copying and arranging the valid data of all the logical pages belonging to the logical block 610(0) to the log physical blocks 410(R+3), 410(R+4) and 410(R+5), the memory management circuit 302 selects a data physical block 410(T+2) from the data area 506 as a new data physical block corresponding to the logical block 610(0). To be more specific, the memory management circuit 302 selects one blank physical block or one physical block storing the invalid data as the new data physical block. Especially, if the selected physical block is the physical block with invalid data, the memory management circuit 302 first performs the erase operation to the physical block. In other words, the invalid data of the physical block should be erased at first.

Next, the memory management circuit 302 copies the valid data of all logical pages belonging to the logical block 610(0) to the retrieved data physical block 410(T+2) from the log physical blocks 410(R+3), 410(R+4) and 410(R+5) in sequence.

In more detail, the memory management circuit 302 moves the valid data of the $0^{th}$~$85^{th}$ logical pages belonging to the logical block 610(0) from the lower physical pages of the first log physical block 410(R+3) to the corresponding physical pages of the physical block 410(T+2) (e.g. the $0^{th}$~$85^{th}$ physical pages of the physical block 410(T+2)) in sequence. Next, the memory management circuit 302 moves the valid data of the $86^{th}$~$171^{st}$ logical pages belonging to the logical block 610(0) from the lower physical pages of the second log physical block 410(R+4) to the corresponding physical pages (e.g., the 86$^{th}$~171$^{st}$ physical pages) of the physical block 410(T+2). Then, the memory management circuit 302 moves the valid data of the 172$^{th}$~257$^{th}$ logical pages belonging to the logical block 610(0) from the lower physical pages of the third log physical block 410(R+5) to the corresponding physical pages (e.g., the 172$^{th}$~257$^{th}$ physical pages) of the physical block 410(T+2). In other words, the physical blocks of the data area 506 are operated in the multi-page mode, so the data are stored into all the lower physical pages, the middle physical pages and the upper physical pages of the physical block 410(T+2). According to the present exemplary embodiment, for instance, the memory management circuit 302 uses a copyback command for effectively moving the valid data from the log physical block to the data physical block during the data move operation.

Thereafter, the memory management circuit 302 re-maps the logical block 610(0) to the physical block 410(T+2) in the logical block-physical block mapping table.

In addition, the valid data of all the logical pages belonging to the logical block 610(0) are already copied to the physical block 410(T+2). Therefore, in an exemplary embodiment of the present invention, the memory management circuit 302 marks the log physical blocks 410(R+3), 410(R+4) and 410(R+5) as the physical blocks storing the invalid data or performs the erase operation to the log physical blocks 410(R+3), 410(R+4) and 410(R+5), then data are available to be written to the physical blocks 410(R+3), 410(R+4) and 410(R+5) again when executing the following write commands.

It should be mentioned that, in the present exemplary embodiment, the memory management circuit 302 performs the data arrangement operation (shown in FIG. 7) and the data move operation (shown in FIG. 8) with a partial synchronization manner. In other words, when the memory management circuit 302 intends to merge and move the valid data separately stored in the data physical block (i.e., the first data physical block, for instance, the data physical block 410(T+1) shown in FIG. 7) and the spare physical block (i.e., the spare physical blocks 410(R+1), 401(R+2) shown in FIG. 8) to the blank data physical block (i.e. the second data physical block, for instance, the data physical block 410(T+2) shown in FIG. 8), the memory management circuit 302 copies the arranged valid data from the log physical blocks (i.e. the log physical blocks 410(R+3), 410(R+4) and 410(R+5) shown in FIG. 8) to the second data physical block while performing the data move operation.

Referring to FIG. 7 and FIG. 8, in the data move operation, the memory management circuit 302 copies the valid data of all the logical pages belonging to the logical block 610(0) to the lower physical pages of the log physical blocks 410(R+3), 410 (R+4) and 410(R+5) in sequence. Especially, after copying the valid data of the 0$^{th}$ logical page belonging to the logical block 610(0) to the log physical block 410(R+3), the memory management circuit 302 continuously transmits commands for copying the valid data of the following logical pages to the log physical block 410(R+3) as well as for simultaneously copying the valid data of the 0$^{th}$ logical page belonging to the logical block 610(0) from the log physical block 410(R+3) to the data physical block 410(T+2). Then, after copying the valid data of the 1$^{st}$, the 2$^{nd}$ and the 3$^{rd}$ logical pages belonging to the logical block 610(0) to the log physical block 410(R+3), the memory management circuit 302 continuously transmits commands for copying the valid data of the following logical pages to the log physical block 410(R+3) as well as for simultaneously copying the valid data of the 1$^{st}$ and the 3$^{rd}$ logical pages belonging to the logical block 610(0) from the log physical block 410(R+3) to the data physical block 410(T+2). Next, after copying the valid data of the 4$^{th}$, the 5$^{th}$ and the 6$^{th}$ logical pages belonging to the logical block 610(0) to the log physical block 410(R+3), the memory management circuit 302 continuously transmits commands for copying the valid data of the following logical pages to the log physical block 410(R+3) as well as for simultaneously copying the valid data of the 2$^{nd}$, the 4$^{th}$ and the 6$^{th}$ logical pages belonging to the logical block 610(0) from the log physical block 410(R+3) to the data physical block 410(T+2). In addition, after copying the valid data of the 7$^{th}$, the 8$^{th\ and\ the}$ 9$^{th}$ logical pages belonging to the logical block 610(0) to the log physical block 410(R+3), the memory management circuit 302 continuously transmits commands for copying the valid data of the following logical pages to the log physical block 410(R+3) as well as for simultaneously copying the valid data of the 5$^{th}$, the 7$^{th}$ and the 9$^{th}$ logical pages belonging to the logical block 610(0) from the log physical block 410(R+3) to the data physical block 410(T+2). Since the rest can be deduced by the same, during the period of arranging the valid data belonging to the following logical pages, the memory management circuit 302 synchronously moves a portion of the arranged valid data from the log physical blocks to the data physical blocks until all of the valid data are moved to the data physical blocks. In other words, in the present exemplary example, when the data of a predetermined number of the logical pages (e.g. 3 logical pages) are adjusted and arranged, the memory management circuit 302 synchronously moves a portion of the arranged valid data from the log physical blocks to the data physical blocks while arranging and adjusting the valid data of the following logical pages.

It should be noted that, the method of the data arrangement operation and the data move operation with the partial synchronization manner described above is only an exemplary example and is not intended to limit the scope of the present invention. For example, in another exemplary embodiment of the present invention, after copying the valid data of the 0$^{th}$ logical page belonging to the logical block 610(0) to the log physical block 410(R+3), the memory management circuit 302 continuously transmits commands for copying the valid data of the following logical pages to the log physical block 410(R+3) as well as for simultaneously copying the valid data of the 0$^{th}$ logical page belonging to the logical block 610(0) from the log physical block 410(R+3) to the data physical block 410(T+2). Then, after copying the valid data of the 2$^{nd}$ logical page belonging to the logical block 610(0) to the log physical block 410(R+3), the memory management circuit 302 continuously transmits commands for copying the valid data of the following logical pages to the log physical block 410(R+3) as well as for simultaneously copying the valid data of the 2$^{nd}$ logical page belonging to the logical block 610(0) from the log physical block 410(R+3) to the data physical block 410(T+2). Next, after copying the valid data of the 3$^{rd}$ logical page belonging to the logical block 610(0) to the log physical block 410(R+3), the memory management circuit 302 continuously transmits commands for copying the valid data of the following logical pages to the log physical block 410(R+3) as well as for simultaneously copying the valid data of the 3$^{rd}$ logical page belonging to the logical block 610(0) from the log physical block 410(R+3) to the data physical block 410(T+2). Since the rest can be deduced by the same, during the period of arranging the valid data belonging to the following logical pages, the memory management circuit 302 synchronously moves the valid data from the log physical blocks to the data physical blocks until all of the valid data are moved to the data physical blocks. In other words, in the present exemplary example, when the data of one logical page is adjusted and arranged, the memory management circuit 302 synchronously moves the arranged valid data from the log physical blocks to the data physical blocks while arranging and adjusting the valid data of the following logical pages.

Based on the above description, since the data arrangement operation and the data move operation are executed with a partial synchronization manner, the required time of data merging operation is effectively shorten.

Figure 9:
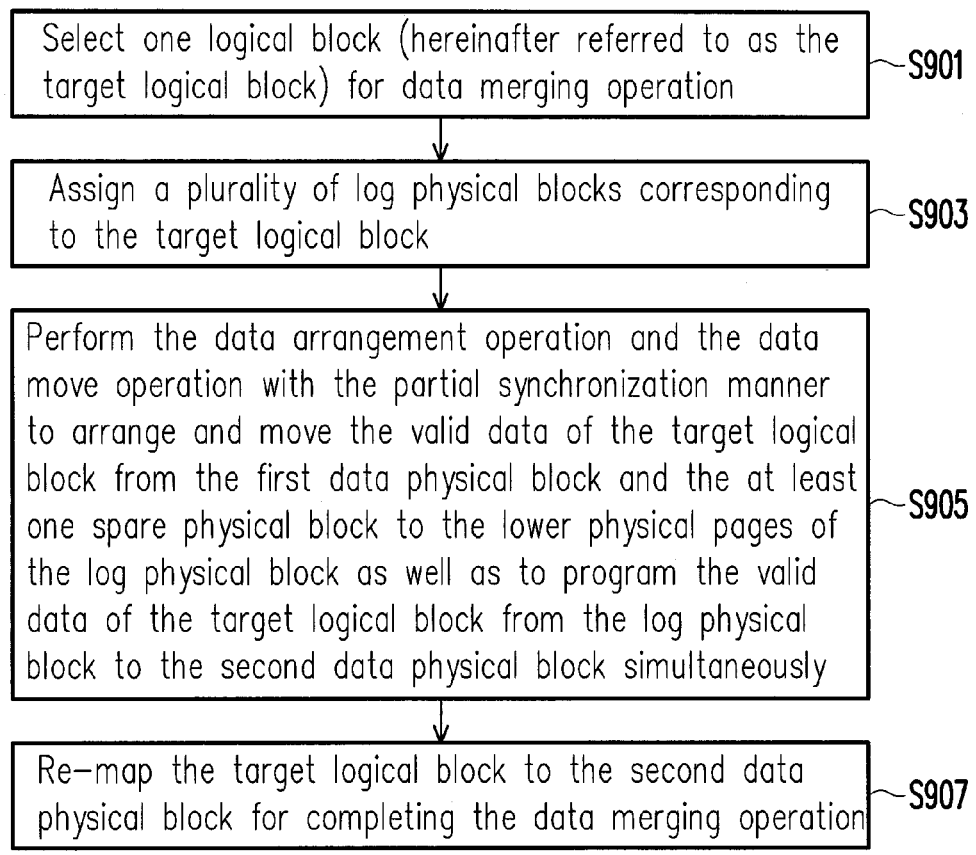
FIG. 9 is a flowchart illustrating the steps of the data merging method according to an exemplary embodiment.

FIG. 9 is a flowchart illustrating the steps of the data merging method according to an exemplary embodiment.

With reference to FIG. 9, in step S901, the memory management circuit 302 selects one logical block (hereinafter referred to as the target logical block) for data merging operation. To be more specific, the memory management circuit 302 identifies the logical blocks requiring the data merging operation according to the data temporarily stored in the spare area 504, and one of the logical blocks is selected for data merging operation. The valid data of the target logical block are already separately stored in the data physical block (hereinafter referred as the first data physical block) and at least one spare physical block.

In step S903, the memory management circuit 302 assigns a plurality of log physical blocks corresponding to the target logical block. For instance, in the present exemplary embodiment, the memory management circuit 302 selects 3 physical blocks from the spare area 504 as the first to the third log physical blocks corresponding to the target logical block.

In step S905, the memory management circuit 302 performs the data arrangement operation and the data move operation with the partial synchronization manner to arrange and move the valid data of the target logical block from the first data physical block and the at least one spare physical block to the lower physical pages of the log physical block as well as to program the valid data of the target logical block from the log physical block to the second data physical block simultaneously.

In step S907, the memory management circuit 302 re-maps the target logical block to the second data physical block for completing the data merging operation.

Figure 10:
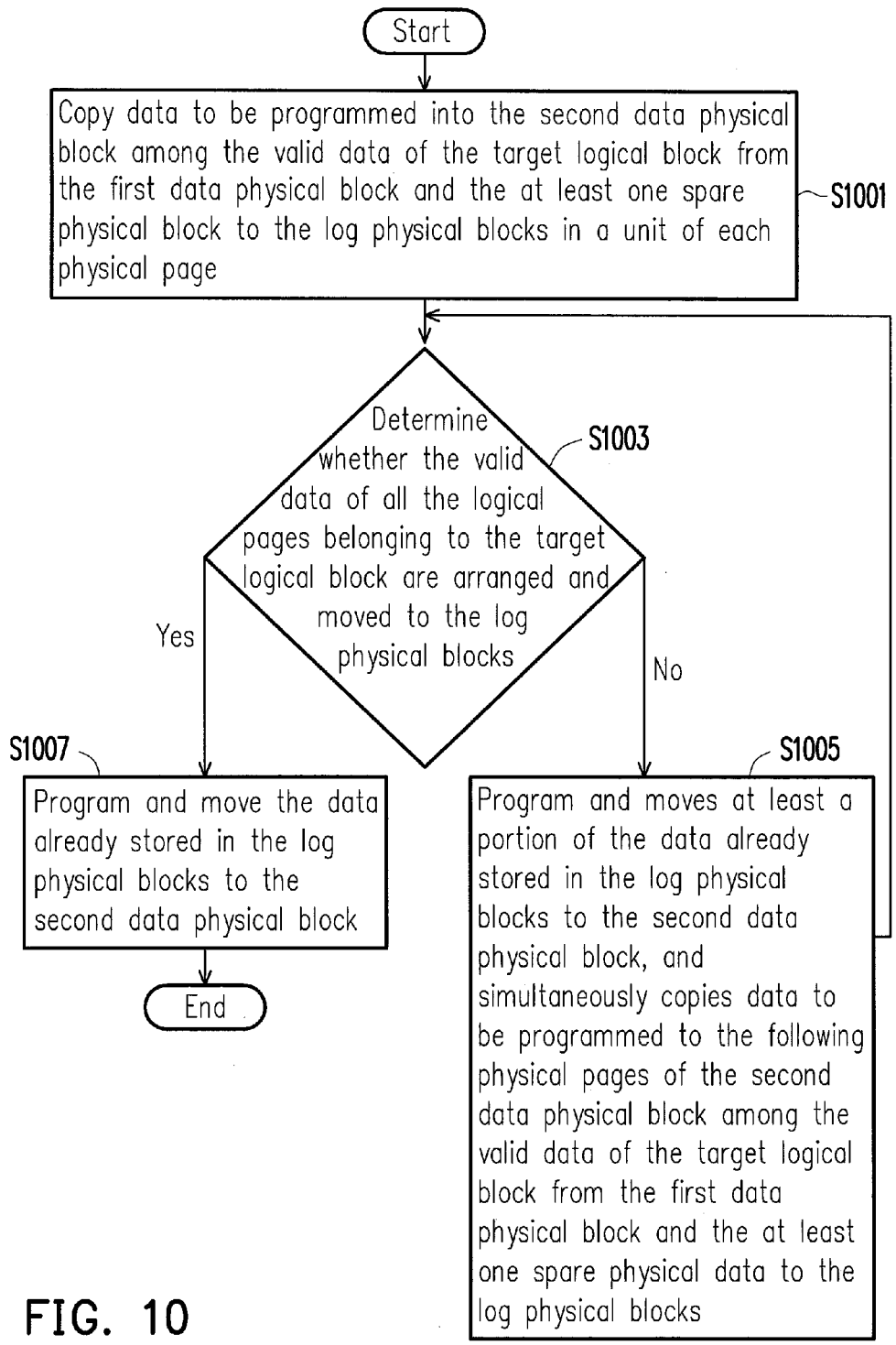
FIG. 10 is a detailed flowchart illustrating step S905 of the data merging method according to an exemplary embodiment.

FIG. 10 is a detailed flowchart illustrating step S905 of the data merging method according to an exemplary embodiment.

Referring to FIG. 10, in step S1001, the memory management circuit 302 copies data to be programmed into the second data physical block among the valid data of the target logical block from the first data physical block and the at least one spare physical block to the log physical blocks in a unit of each physical page.

After that, in step S1003, the memory management circuit 302 determines whether the valid data of all the logical pages belonging to the target logical block are arranged and moved to the log physical blocks.

If the valid data of all the logical pages belonging to the target logical block have not been completely arranged and moved to the log physical blocks, in step S1005, the memory management circuit 302 programs and moves at least a portion of the data already stored in the log physical blocks to the second data physical block, and simultaneously copies data to be programmed to the following physical pages of the second data physical block among the valid data of the target logical block from the first data physical block and the at least one spare physical data to the log physical blocks. Accordingly, after step S1005 is performed, the step S1003 is executed.

When the valid data of all the logical pages belonging to the target logical block are arranged and moved to the log physical blocks, in step S1007, the memory management circuit 302 programs and moves the data already stored in the log physical blocks to the second data physical block. After step S1007, the data arrangement operation and data move operation are completed.

Based on the above, the data merging method, the memory controller and the memory storage device in the exemplary embodiments of the present invention arrange and move the data to be merged to the log physical blocks under single-page mode, and program the data from the log physical blocks to the data physical block. Therefore, the reliability of storing the data can be improved. In addition, the data merging method, the memory controller and the memory storage device in the exemplary embodiments of the present invention perform the operation of moving and arranging the valid data to the log physical blocks and the operation of copying the valid data to the data physical block with a partial synchronization manner for shortening the time of performing the data merging operation. The previously described exemplary embodiments of the present invention have the advantages aforementioned, wherein the advantages aforementioned not required in all versions of the invention.

Although the invention has been described with reference to the above embodiments, it will be apparent to one of ordinary skill in the art that modifications to the described embodiments may be made without departing from the spirit of the invention. Therefore, the protecting range of the invention falls in the appended claims.

What is claimed is:

1. A data merging method, for merging valid data of a logical block in a rewritable non-volatile memory module, wherein the rewritable non-volatile memory module has a plurality of physical blocks, each of the physical blocks includes a plurality of physical page groups, and each of the physical page groups comprises at least a lower physical page and an upper physical page, a speed of writing data into the lower physical pages is faster than a speed of writing data into the upper physical pages, the valid data of the logical block are separately stored in a first data physical block and at least one spare physical block among the physical blocks, and the valid data of the logical block are merged into a second data physical block among the physical blocks, the data merging method comprising:

assigning a plurality of log physical blocks corresponding to the logical block;

performing a data arrangement operation and a data move operation with a partial synchronization manner, wherein the data arrangement operation is performed to arrange and copy the valid data of the logical block from the first data physical block and the at least one spare physical block to the lower physical pages of the log physical blocks, and the data move operation is performed to move the valid data of the logical block from the log physical blocks to the second data physical block; and remapping the logical block to the second data physical block.

2. The data merging method as claimed in claim 1, wherein the step of performing the data arrangement operation and the data move operation with the partial synchronization manner comprises:

(a) copying valid data belonging to a number of logical pages among the valid data of the logical block from the first data physical block and the at least one spare physical block to the lower physical pages of the log physical blocks, wherein the number of the logical pages is a predetermined number;

(b) copying the valid data belonging to the number of logical pages from the log physical blocks to the second data physical block, and simultaneously copying following valid data belonging to other logical pages among the valid data of the logical block from the first data physical block and the at least one spare physical block to following lower physical pages of the log physical blocks; and (c) repeating the steps (a) and (b) until all the valid data of the logical block are copied to the second data physical block.

3. The data merging method as claimed in claim 1, wherein the step of performing the data arrangement operation and the data move operation with the partial synchronization manner comprises:

(a) copying valid data belonging to one logical page among the valid data of the logical block from the first data physical block and the at least one spare physical block to the lower physical pages of the log physical blocks;

(b) copying the valid data belonging to the one logical page from the log physical blocks to the second data physical block, and simultaneously copying valid data belonging to a next logical page among the valid data of the logical block from the first data physical block and the at least one spare physical block to following lower physical pages of the log physical blocks; and (c) repeating the steps (a) and (b) until all the valid data of the logical block are copied to the second data physical block.

4. The data merging method as claimed in claim 1, wherein a copyback command is applied for performing the data move operation.

5. The data merging method as claimed in claim 1, wherein each of the physical page groups further comprises a middle physical page, the speed of writing data into the lower physical pages is faster than a speed of writing data into the middle physical pages, and the speed of writing data into the middle physical pages is faster than the speed of writing data into the upper physical pages.

6. The data merging method as claimed in claim 5, further comprises:

partitioning the physical blocks into at least a data area and a spare area, wherein the first data physical block and the second data physical block belong to the data area and the at least one spare physical block is assigned from the spare area.

7. The data merging method as claimed in claim 6, wherein the step of assigning the log physical blocks corresponding to the logical block from the spare area comprise:

selecting three physical blocks as a first log physical block, a second log physical block and a third log physical block corresponding to the logical block from the spare area.

8. A memory controller, for controlling a rewritable non-volatile memory module, wherein the rewritable nonvolatile memory module has a plurality of physical blocks, each of the physical blocks comprises a plurality of physical page groups, and each of the physical page groups comprises at least a lower physical page and an upper physical page, a speed of writing data into the lower physical pages is faster than a speed of writing data into the upper physical pages, the memory controller comprising:

a host interface, configured to couple to a host system;
a memory interface, configured to couple to the rewritable non-volatile memory module; and
a memory management circuit, coupled to the host interface and the memory interface, and configured to merge valid data of a logical block into a second data physical block of the physical blocks, wherein the valid data of the logical block are separately stored in a first data physical block and at least one spare physical block of the physical blocks, wherein the memory management circuit is further configured to assign a plurality of log physical blocks corresponding to the logical block, and perform a data arrangement operation and a data move operation with a partial synchronization manner, wherein the data arrangement operation is performed to arrange and copy the valid data of the logical block from the first data physical block and the at least one spare physical block to the lower physical pages of the log physical blocks, and the data move operation is performed to move the valid data of the logical block from the log physical blocks to the second data physical block, wherein the memory management circuit is further configured to remap the logical block to the second data physical block.

9. The memory controller as claimed in claim 8, wherein during a period of performing the data arrangement operation and the data move operation with the partial synchronization manner, the memory management circuit is configured to copy valid data belonging to a number of logical pages among the valid data of the logical block from the first data physical block and the at least one spare physical block to the lower physical pages of the log physical blocks, wherein the number of the logical pages is a predetermined number, wherein during the period of performing the data arrangement operation and the data move operation with the partial synchronization manner, the memory management circuit is configured to copy the valid data belonging to the number of logical pages from the log physical blocks to the second data physical block, and simultaneously copy following valid data of the logical block belonging to other logical pages from the first data physical block and the at least one spare physical block to following lower physical pages of the log physical blocks.

10. The memory controller as claimed in claim 8, wherein during the period of performing the data arrangement operation and the data move operation with the partial synchronization manner, the memory management circuit is configured to copy valid data belonging to one logical page among the valid data of the logical block from the first data physical block and the at least one spare physical block to the lower physical pages of the log physical blocks, wherein during the period of performing the data arrangement operation and the data move operation with the partial synchronization manner, the memory management circuit is configured to copy the valid data belonging to the one logical page from the log physical blocks to the second data physical block, and simultaneously copy valid data belonging to a next logical page among the valid data of the logical block from the first data physical block and the at least one spare physical block to following lower physical pages of the log physical blocks.

11. The memory controller as claimed in claim 8, wherein the memory management circuit is configured to use a copyback command for performing the data move operation.

12. The memory controller as claimed in claim 8, wherein each of the physical page groups further comprises a middle physical page, the speed of writing data into the lower physical pages is faster than a speed of writing data into the middle physical pages, and the speed of writing data into the middle physical pages is faster than the speed of writing data into the upper physical pages.

13. The memory controller as claimed in claim 12, wherein the memory management circuit is configured to partition the physical blocks into at least a data area and a spare area,
wherein the first data physical block and the second data physical block belong to the data area and the at least one spare physical block is assigned from the spare area.

14. The memory controller as claimed in claim 13, wherein the memory management circuit is configured to select three physical blocks as a first log physical block, a second log physical block and a third log physical block corresponding to the logical block from the spare area.

15. A memory storage device, comprising:
a connector, configured to couple to a host system;
a rewritable non-volatile memory module, having a plurality of physical blocks, each of the physical blocks comprises a plurality of physical page goups, and each of the physical page groups has at least a lower physical page and an upper physical page, a speed of writing data into the lower physical pages is faster than a speed of writing data into the upper physical pages; and
a memory controller, coupled to the connector and the rewritable non-volatile memory module, and configured to merge valid data of a logical block into a second data physical block of the physical blocks, wherein the valid data of the logical block are separately stored in a first data physical block and at least one spare physical block of the physical blocks,
wherein the memory controller is further configured to assign a plurality of log physical blocks corresponding to the logical block, and perform a data arrangement operation and a data move operation with a partial synchronization manner,
wherein the data arrangement operation is performed to arrange and copy the valid data of the logical block from the first data physical block and the at least one spare physical block to the lower physical pages of the log physical blocks, and the data move operation is performed to move the valid data of the logical block from the log physical blocks to the second data physical block,
wherein the memory controller is further configured to remap the logical block to the second data physical block.

16. The memory storage device as claimed in claim 15, wherein during a period of performing the data arrangement operation and the data move operation with the partial synchronization manner, the memory controller is configured to copy valid data belonging to a number of logical pages among the valid data of the logical block from the first data physical block and the at least one spare physical block to the lower physical pages of the log physical blocks, wherein the number of the logical pages is a predetermined number,
wherein during the period of performing the data arrangement operation and the data move operation with the partial synchronization manner, the memory controller is configured to copy the valid data belonging to the number of logical pages from the log physical blocks to the second data physical block, and simultaneously copy following valid data of the logical block belonging to other logical pages from the first data physical block and the at least one spare physical block to following lower physical pages of the log physical blocks.

17. The memory storage device as claimed in claim 15, wherein during the period of performing the data arrangement operation and the data move operation with the partial synchronization manner, the memory controller is configured to copy valid data belonging to one logical page among the valid data of the logical block from the first data physical block and the at least one spare physical block to the lower physical pages of the log physical blocks,
wherein during the period of performing the data arrangement operation and the data move operation with the partial synchronization manner, the memory controller is configured to copy the valid data belonging to the one logical page from the log physical blocks to the second data physical block, and simultaneously copy valid data belonging to a next logical page among the valid data of the logical block from the first data physical block and the at least one spare physical block to following lower physical pages of the log physical blocks.

18. The memory storage device as claimed in claim 15, wherein the memory controller is configured to use a copyback command for performing the data move operation.

19. The memory storage device as claimed in claim 15, wherein each of the physical page groups further comprises a middle physical page, the speed of writing data into the lower physical pages is faster than a speed of writing data into the middle physical pages, and the speed of writing data into the middle physical pages is faster than the speed of writing data into the upper physical pages.

20. The memory storage device as claimed in claim 19, wherein the memory controller is configured to partition the physical blocks into at least a data area and a spare area,
wherein the first data physical block and the second data physical block belong to the data area and the at least one spare physical block is assigned from the spare area.

21. The memory storage device as claimed in claim 20, wherein the memory controller is configured to select three physical blocks as a first log physical block, a second log physical block and a third log physical block corresponding to the logical block from the spare area.

* * * * *